United States Patent
Wong

[11] Patent Number: 5,818,708
[45] Date of Patent: Oct. 6, 1998

[54] HIGH-VOLTAGE AC TO LOW-VOLTAGE DC CONVERTER

[75] Inventor: Stephen L. Wong, Scarsdale, N.Y.

[73] Assignee: Philips Electronics North America Corporation, New York, N.Y.

[21] Appl. No.: 764,837

[22] Filed: Dec. 12, 1996

[51] Int. Cl.⁶ .............................. H02M 5/42; H02M 3/18
[52] U.S. Cl. .............................. 363/89; 363/59; 363/124; 223/222
[58] Field of Search ................................ 363/89, 59, 124, 363/127; 323/222

[56] References Cited

U.S. PATENT DOCUMENTS

| | | | |
|---|---|---|---|
| 4,641,233 | 2/1987 | Roy | 363/89 |
| 4,685,046 | 8/1987 | Sanders | 363/89 |
| 4,768,142 | 8/1988 | Pasma | 363/89 |
| 4,816,982 | 3/1989 | Severinsky | 363/44 |
| 5,055,994 | 10/1991 | Schoofs | 363/127 |
| 5,499,183 | 3/1996 | Kobatake | 363/59 |

FOREIGN PATENT DOCUMENTS

| | | | |
|---|---|---|---|
| 0106041B1 | 4/1984 | European Pat. Off. | H02M 7/217 |
| 0324902B1 | 7/1989 | European Pat. Off. | H02M 3/10 |
| 0399598A2 | 11/1990 | European Pat. Off. | H02M 7/219 |
| 3327003C2 | 4/1984 | Germany | H02M 3/10 |
| 3245238A1 | 6/1984 | Germany | H02P 13/24 |
| 3304759A1 | 8/1984 | Germany | H02M 3/155 |
| 4103108A1 | 8/1992 | Germany | H03K 17/13 |

*Primary Examiner*—Peter S. Wong
*Assistant Examiner*—Rajnikant B. Patel
*Attorney, Agent, or Firm*—Steven R. Biren

[57] ABSTRACT

A high-voltage AC to low-voltage DC converter includes a rectifier circuit for providing a pulsating high-voltage DC signal from the high-voltage AC input and a switch having its main current path coupled between the rectifier circuit output and an output terminal of the converter. A filter capacitor is coupled to the output terminal to filter the low-voltage DC output, and first and second voltage sensors are coupled to the rectifier output and the low-voltage DC output terminal of the converter circuit, respectively. The first voltage sensor is set to sense a low (typically zero) voltage, and the second voltage sensor is set to sense the desired low-voltage DC output level. The outputs of the first and second voltage sensors are coupled to the set and reset inputs, respectively, of a latch circuit, with the output of the latch circuit being coupled to a control terminal of the switch in order to turn on the switch upon receiving a set input from the first voltage sensor and then turn off the switch on receiving a reset input from the second voltage sensor. This converter configuration provides a compact and highly-efficient circuit.

7 Claims, 2 Drawing Sheets

HIGH-VOLTAGE AC TO LOW-VOLTAGE DC CONVERTER

BACKGROUND OF THE INVENTION

This invention relates to a converter power supply circuit for energizing a load, and more particularly to a transformerless power supply circuit for converting a high AC input voltage into a relatively low DC output voltage for an electric load.

There are many applications where it is required to provide a low DC voltage from a source of AC voltage such as the available 60 Hz AC supply voltage. For example, in high power or high voltage integrated circuit (IC) applications it is often necessary to generate a low DC voltage to supply the control circuits.

There are various known ways of carrying out such a conversion. For example, the AC supply voltage may be transformed to a lower AC voltage by means of a transformer which in turn feeds a rectifier. This is a bulky and expensive arrangement and is also not very efficient.

Another possibility is to rectify the AC supply voltage and reduce the high DC voltage so produced by means of a series voltage dropping element, e.g. a resistor or a transistor. However, such an arrangement requires a high power dissipation in the series element and so it is not very efficient.

U.S. Pat. No. 5,055,994 describes an AC voltage to a low DC voltage converter which includes a semiconductor switching element, a diode and a capacitor connected in series circuit between the AC voltage supply lines. The DC output voltage is derived across the capacitor. A sensing (control) circuit is responsive to the input voltage and is arranged to trigger the switching element to conduct only during a portion of the AC voltage below a predetermined voltage level. The gate control voltage for the transistor switching element must be set outside the voltage range of the capacitive voltage which means that the control circuit must be powered from the input AC voltage rather than from the DC output voltage. In addition, at least one resistor is used to supply current to the control circuit from the AC input, and a zener diode is connected in series with the resistor in order to clamp the voltage to the control circuit. This results in a number of disadvantages, including large power consumption in the resistor, the use of high voltage components, and difficulty in integrating the control circuitry. These disadvantages limit the utility of this form of AC/DC converter.

U.S. Pat. No. 4,768,142 describes a power supply circuit which maintains the voltage across a first capacitor substantially constant over a wide range of mains voltages, wherein the capacitor energizes a motor and is charged during the rising edges of the applied mains voltage in that above a specific input voltage a first transistor is turned on via a second capacitor and a first resistor. When the rectified mains voltage at the output of a diode exceeds a specific value defined by a first zener diode, a second transistor is turned on. Consequently, the first transistor is turned off. When the first transistor is cut off, the first capacitor is discharged through the motor. The second capacitor is then discharged via a second zener diode and prevents the first transistor from being turned on. Although this circuit is useful as the power supply circuit of an electric shaver since it allows the shaver to be energized by different AC supply voltages (e.g. 115V and 230V), it too wastes power and is relatively complex and costly.

In DE 32 45 238, a controllable transistor switch is driven by a driver stage which in turn receives a phase-shifted AC supply voltage and an unshifted rectified supply voltage. A switch receives the rectified supply voltage. This power supply also provides a relatively low DC voltage directly from the rectified supply voltage. The switch is turned on via a diode and a resistor when the rectifier supply voltage is at a predetermined low level. The switch is turned off by a second transistor when the phase-shifted AC voltage reaches a predetermined high level. The switch is turned off by means of a signal derived from the phase-shifted AC supply voltage, rather than by a voltage sensor coupled to the output voltage and a latch circuit.

Another AC/DC converter circuit is shown in EP 0 324 902. A step-down transformer couples a 220V AC line voltage to a load capacitor via a full-wave rectifier, a switch and a diode. The switch is controlled by a flipflop having a reset input coupled to the capacitor via a low voltage sensor and a set-input coupled to the capacitor via a high voltage sensor. The switch is closed when the voltage Ua at the capacitor drops below a reference voltage U2. The switch is opened when the rectifier supply voltage U11 drops below a reference voltage U1. The waveforms in FIG. 2 of EP'902 show that the switch is closed (conductive) from the instant that the voltage Ua drops below the relatively high reference voltage U2 until the next zero crossing.

The purpose of this circuit is to ensure that the output voltage of the circuit does not drop below a preset value (U2). To do so, the circuit uses a transformer to step the AC supply voltage down to a low AC voltage, then uses an active switching circuit to control the amount of charge delivered to the load capacitor.

The power supply in EP 0 324 902 uses sensors that take input only from the circuit's output voltage; this allows the switch to turn on only if the output drops below U2 and to turn off if the unrectified output (i.e. the node before the diode) drops below the voltage U1. This power supply also needs a bulky transformer and a diode before the load capacitor and therefore can not be easily integrated. Furthermore, the instant of turn-on of the switch (13) varies widely as a function of the load, which could result in large power losses in the switch.

SUMMARY OF THE INVENTION

It is an object of the present invention to provide an AC/DC power supply converter circuit that overcomes the disadvantages present in the prior art, as discussed above.

Another object of the invention is to provide an AC/DC converter circuit which is more efficient than comparable prior-art circuits.

A further object of the invention is to provide a highly-efficient AC/DC converter that operates directly from the AC supply voltage lines without the use of a step-down transformer.

A still further object of the invention is to provide an AC/DC converter having a low power loss so that the active switching circuit can be readily integrated into a single integrated circuit According to the invention, the foregoing and other objects are achieved by an AC/DC converter circuit in which a switch and a load capacitor are connected in series between the output terminals of a rectifier circuit which has its input terminals connected directly to a source of AC supply voltage. A latch circuit controls the switching of the switch so that the switch is only conductive when the AC supply voltage, i.e. the rectified pulsating voltage at the output of the rectifier circuit, is at a low voltage level. Since the switch only conducts when the supply voltage is low, there is a very low power loss or dissipation in the switch, thereby making the converter very efficient. The latch is controlled by a low (typically zero) voltage sensing circuit coupled to the input side of the circuit which turns on the switch when the input voltage drops to the low voltage level. The latch is also controlled by a second voltage sensing circuit coupled to the load (output) capacitor so as to turn off the switch when the capacitor is charged to a desired low value (for example 15V) of DC voltage. The load capacitor is thereby directly charged to a low DC voltage from a high AC voltage.

In a preferred embodiment of the invention, the switch is an FET switch, which can either be a JFET switch or a depletion-type MOSFET switch.

In a further preferred embodiment of the invention, the low voltage level sensed by the first voltage sensor is substantially zero volts and the voltage sensed by the second voltage sensor is substantially equal to the desired low-voltage DC output level of the converter circuit.

High-voltage AC to low-voltage DC converters in accordance with the present invention offer a significant improvement in that a compact and highly-efficient circuit is obtained, and in that the circuit can be more readily integrated since no step-down transformer is required.

These and other aspects of the invention will be apparent from and elucidated with reference to the embodiments described hereinafter.

BRIEF DESCRIPTION OF THE DRAWING

The invention may be more completely understood with reference to the following description, to be read in conjunction with the accompanying drawing, in which.

In the drawing, like reference numerals are generally used to refer to like components.

DESCRIPTION OF THE PREFERRED EMBODIMENTS

Figure 1:
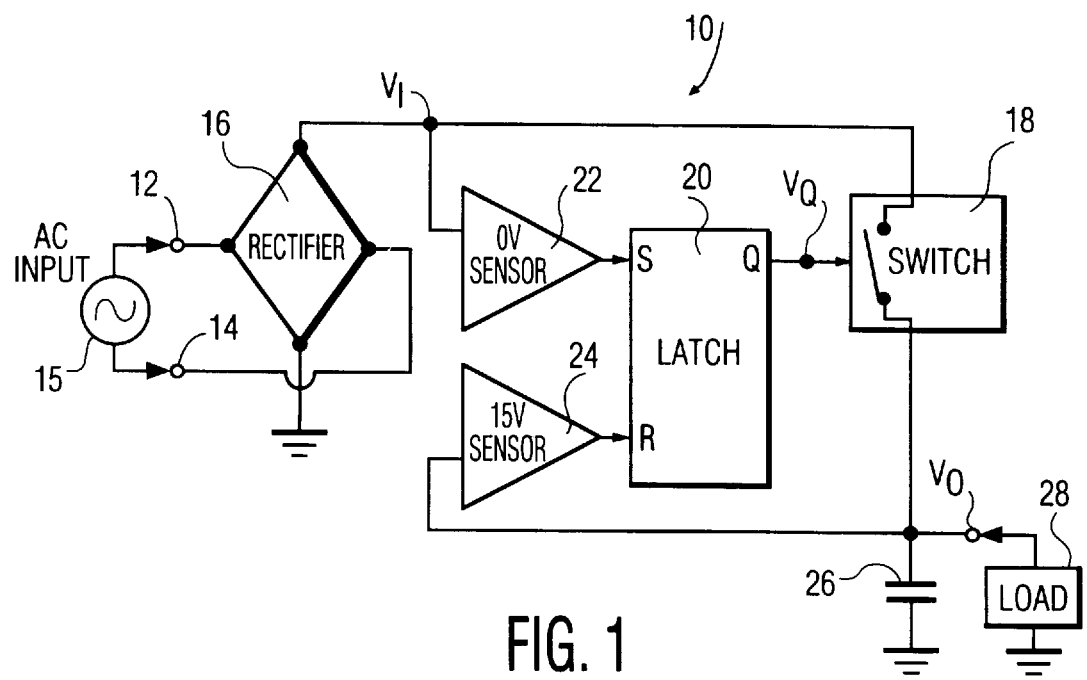
FIG. 1 shows a block diagram of a high-voltage AC to low-voltage DC converter in accordance with the invention.
Figure 2:
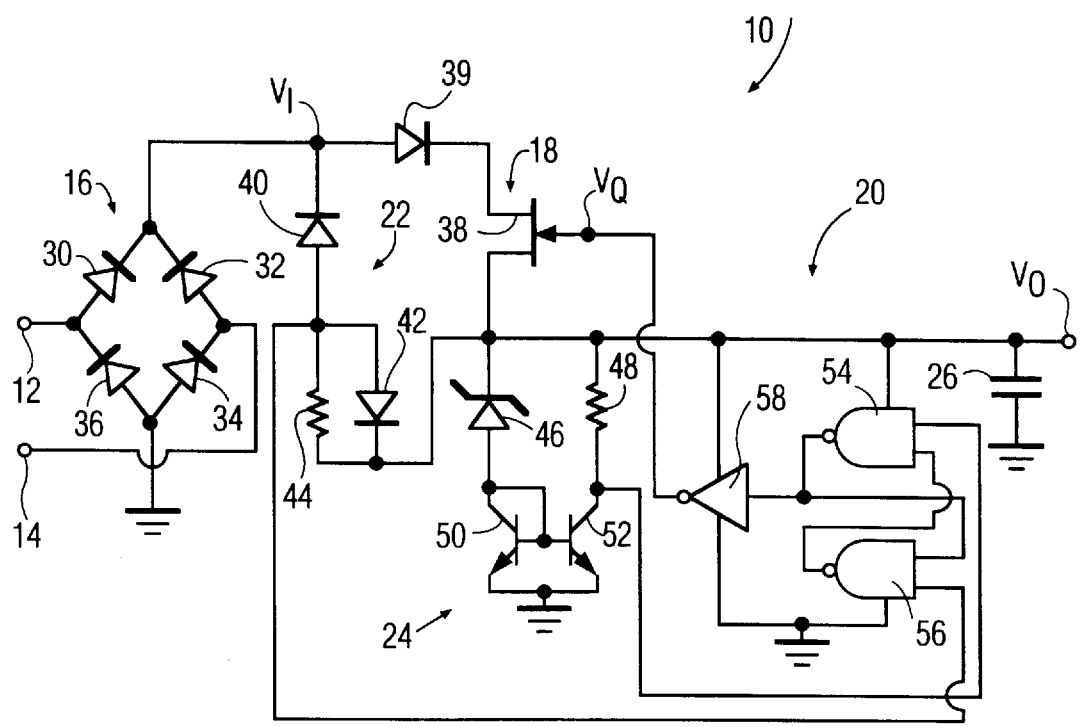
FIG. 2 shows a schematic diagram of a high-voltage AC to low-voltage DC converter in accordance with the invention.

A high-voltage AC to low-voltage DC converter 10 in accordance with the invention is shown in block-diagram form in FIG. 1. The converter includes AC input terminals 12 and 14 for receiving a high-voltage AC input signal 15, with the input terminals being coupled to a rectifier circuit 16 which serves to generate a rectified or pulsating high-voltage DC signal $V_I$ from the AC input signal. The rectifier circuit may be a full-wave rectifier circuit, as shown in FIG. 2, a half-wave rectifier circuit or any other suitable circuit for generating a pulsating DC output from an AC input.

The output of rectifier circuit 16 is coupled to a switch 18 which provides a switchable current path between the rectifier circuit output $V_I$ and an output terminal $V_O$ of the converter.

The switch 18 is controlled by a latch circuit 20, such as a flip-flop circuit, having a set input S, a reset input R, and an output Q at which a control voltage $V_Q$ is generated for controlling the switch 18.

The set input S of the latch 20 is driven by a first voltage sensor 22 having its input coupled to the rectifier 16 output $V_I$ for sensing a first voltage level lower than the DC output voltage $V_O$ of the circuit, in this case a voltage of zero volts. The reset input R of the latch circuit 20 is coupled to the output of a second voltage sensor 24 which has its input coupled to the output terminal $V_O$ in order to sense the DC output voltage of the converter circuit, in this case, by way of example only, 15 volts.

A filter capacitor 26 is coupled to the output terminal $V_O$ in order to smooth the DC output voltage, and, in operation, a load 28 will be coupled to the output terminal $V_O$ to receive the DC output voltage generated by the converter circuit.

FIG. 2 shows a schematic diagram of a high-voltage AC to low-voltage DC converter circuit 10 in accordance with the invention. In this embodiment, the rectifier circuit 16 is a full-wave bridge rectifier circuit composed of diodes 30, 32, 34 and 36, although any other suitable form of rectifier circuit, such as a half-wave bridge circuit, may be employed. The switch 18 is shown here as a JFET 38, although other types of switches, such as a depletion-mode MOS transistor may alternatively be used. Since JFET 38 conducts bidirectionally, a diode 39 is provided to prevent conduction through the JFET when the voltage at output terminal $V_O$ is greater than the voltage at rectifier circuit output $V_I$.

The first voltage sensor 22 is realized by a high-voltage sensing diode 40, a diode 42 and a resistor 44, while the second voltage sensor 24 is composed of a zener diode 46, a resistor 48 and a current mirror composed of bipolar transistors 50 and 52. The invention is not limited to the particular sensor configurations shown, and other suitable voltage sensors may be used instead.

In the circuit of FIG. 2, the latch circuit 20 is composed of NAND gates 54 and 56 and inverter 58, although it will be recognized by those skilled in this art that the latch circuit shown is merely one illustrative embodiment, and that any suitable latch circuit may be employed.

Figure 3:
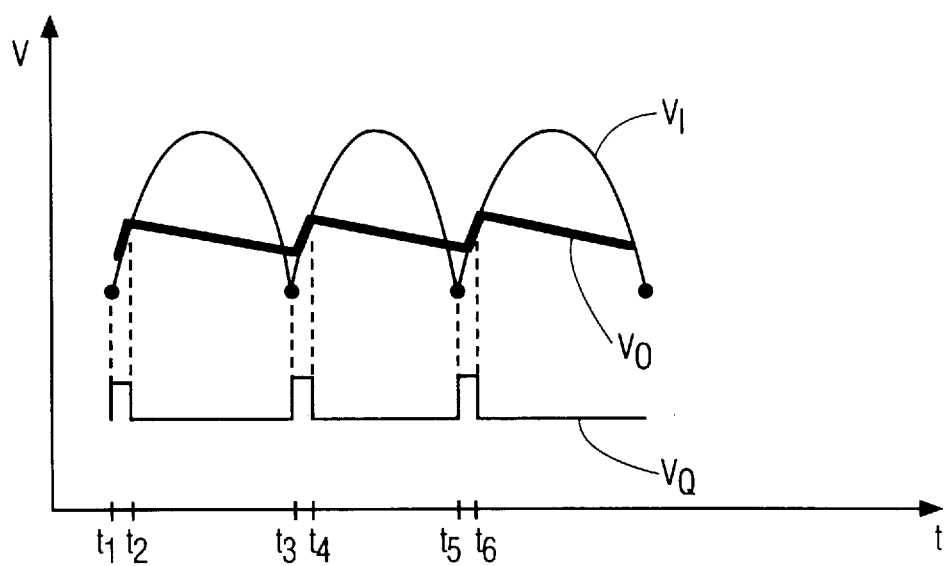
FIG. 3 shows several voltage waveforms generated by the converter of FIG. 2 (not to scale).

Operation of the high-voltage AC to low-voltage DC converter circuit 10 will be explained with reference to the waveforms shown in FIG. 3. In FIG. 3, the high-voltage pulsating DC signal $V_I$ at the output of rectifier circuit 16 is shown as a series of positive-going sinusoidal half-waves, with each pulsation varying from substantially zero volts up to a peak voltage which is determined by the magnitude of the AC input signal applied to terminals 12 and 14. Each time the waveform $V_I$ returns to approximately zero volts, the first voltage sensor, here a zero volt sensor, will detect this level and provide a set input S to the latch 20, causing its output $V_Q$ go high, as shown by waveform $V_Q$ at times $t_1$, $t_3$ and $t_5$ in FIG. 3. Subsequently, when rectifier output $V_I$ rises to the desired DC output voltage of the circuit, here 15 volts for illustration, the second voltage sensor (15 volt sensor) 24 will reset latch 20, causing the voltage $V_Q$ to go low, as shown in FIG. 3 at times $t_2$, $t_4$ and $t_6$.

Since switch 18 is controlled by the voltage $V_Q$, it will be apparent that this switch will be turned on at times $t_1$, $t_3$ and $t_5$, and turned off at times $t_2$, $t_4$ and $t_6$ When switch 18 is on, between times $t_1$ and $t_2$, $t_3$ and $t_4$, and $t_5$ and $t_6$, nodes $V_I$ and $V_O$ will be connected, and capacitor 26 will be charged to the voltage at node $V_I$, as shown in FIG. 3. When the voltage $V_O$ on capacitor 26 reaches the desired DC output voltage, here 15 volts, sensor 24 will be activated, thus resetting latch 20 and opening switch 18. This in turn will disconnect output terminal $V_O$ from $V_I$, and the voltage $V_O$ will slowly decay from its maximum value with a time constant determined by capacitor 26 and load 28, until sensor 22 is reactivated by the next cycle, whereupon the latch 20 is again set and switch 18 is turned on, and the cycle is repeated.

Converter circuits in accordance with the present invention offer a number of important advantages. Unlike prior-art circuits which employ bulky transformers and several high-voltage components, the present invention employs no transformer and a minimum of high-voltage components, resulting in an economical, compact and more easily integrated device. Furthermore, since nearly all of the control circuitry is powered from the DC output voltage $V_O$, stable, highly-efficient control circuit operation is obtained.

Additionally, since the switch 18 is rendered conductive at the onset of each pulsating voltage cycle, at or near zero volts, and then turns off when the desired low DC output voltage is reached, conduction takes place only when the input voltage is low, unlike prior-art circuits in which the time at which the switch begins to conduct can vary greatly and conduction can take place when the input voltage is high, thus permitting the present circuit to operate in a stable, consistent and highly-efficient manner.

While the invention has been particularly shown and described with reference to several preferred embodiments thereof, it will be understood by those skilled in the art that various changes in form and detail may be made without departing from the spirit or scope of the invention. Thus, for example, various different types of rectifier circuits or switches may be employed, and different voltage sensor and latch circuits can be substituted to satisfy particular design requirements.

What is claimed is:

1. A high-voltage AC to low-voltage DC converter, which comprises:

AC input terminals for receiving a high-voltage AC signal;

a rectifier circuit having an input coupled to said AC input terminals and an output for providing a pulsating high-voltage DC signals;

a switch having its main current path coupled between said rectifier circuit output and an output terminal of said converter for providing a low-voltage DC output voltage;

a filter capacitor coupled to said output terminal;

a first voltage sensor for directly sensing a first voltage level lower than said DC output voltage and having an input DC coupled to said rectifier output and an output;

a second voltage sensor for sensing a second voltage level substantially equal to said DC output voltage and having an input coupled to said output terminal and an output; and a latch circuit having a set input coupled to the output of said first voltage sensor, a reset input coupled to the output of said second voltage sensor and an output coupled to a control terminal of said switch for turning on said switch upon receiving a set input from said first voltage sensor and then turning off said switch upon receiving a reset input from said second voltage sensor.

2. A high-voltage AC to low-voltage DC converter as in claim 1, wherein said rectifier circuit comprises a full-wave rectifier circuit.

3. A high-voltage AC to low-voltage DC converter as in claim 1, wherein said switch comprises an FET switch.

4. A high-voltage AC to low-voltage DC converter as in claim 3, wherein said FET switch comprises a JFET switch.

5. A high-voltage AC to low-voltage DC converter as in claim 3, wherein said FET switch comprises a depletion-type MOSFET switch.

6. A high-voltage AC to low-voltage DC converter as in claim 1, wherein said first voltage level is about zero volts.

7. A high-voltage AC to low-voltage DC converter as in claim 1, wherein said second voltage level is about 15 volts.

\* \* \* \* \*

UNITED STATES PATENT AND TRADEMARK OFFICE
CERTIFICATE OF CORRRECTION

PATENT NO. : 5,818,708
DATED : Oct. 6, 1998
INVENTOR(S) : Wong

It is certified that error appears in the above-identified patent and that said Letters Patent is hereby corrected as shown below:

On the title page, under item [56] References Cited, insert the following:

U. S. PATENT DOCUMENTS

| EXAMINER INITIAL | PATENT NUMBER | ISSUE DATE | PATENTEE | CLASS | SUBCLASS | FILING DATE IF APPROPRIATE |
|---|---|---|---|---|---|---|
| | 5 4 6 9 0 4 6 | 11/21/95 | Wong et al. | | | |
| | 5 6 5 2 8 2 5 | 7/29/97 | Schmider et al. | | | |
| | | | | | | |

Signed and Sealed this

Thirteenth Day of April, 1999

Attest:

Q. TODD DICKINSON

*Attesting Officer*       Acting Commissioner of Patents and Trademarks